(12) United States Patent  
Baron

(10) Patent No.: US 8,979,115 B1
(45) Date of Patent: Mar. 17, 2015

(54) SHOPPING CART

(71) Applicant: Brett Baron, Jericho, NY (US)

(72) Inventor: Brett Baron, Jericho, NY (US)

(73) Assignee: Brett Baron, Jericho, NY (US)

( * ) Notice: Subject to any disclaimer, the term of this patent is extended or adjusted under 35 U.S.C. 154(b) by 0 days.

(21) Appl. No.: 14/464,659

(22) Filed: Aug. 20, 2014

(51) Int. Cl.
B62B 3/02 (2006.01)
B62B 3/10 (2006.01)
B62B 5/00 (2006.01)

(52) U.S. Cl.
CPC ............... B62B 3/027 (2013.01); B62B 3/106 (2013.01); B62B 5/0003 (2013.01); Y10S 280/04 (2013.01)
USPC ......... 280/651; 280/641; 280/43; 280/DIG. 4

(58) Field of Classification Search
CPC ...... B62B 3/027; B62B 3/106; B62B 5/0003; Y10S 280/04
USPC ......... 280/6.15, 6.151, 30, 401, 490.1, 491.1, 280/491.4, 638, 35, 639, 38, 641, 645, 651, 280/652, 43, 43.17, 47.131, 47.17, 47.18, 280/47.19, 47.2, 47.21, 47.24, 47.26, 47.34, 280/47.35, 63, 64, DIG. 4
See application file for complete search history.

(56) References Cited

U.S. PATENT DOCUMENTS

| 4,765,646 | A | 8/1988 | Cheng |
| 5,531,366 | A | 7/1996 | Strom |
| 5,575,605 | A | 11/1996 | Fisher |
| 6,042,128 | A | 3/2000 | Dinkins |
| 6,045,150 | A * | 4/2000 | Al-Toukhi ................ 280/641 |
| 6,328,329 | B1 | 12/2001 | Smith |
| 6,575,491 | B2 * | 6/2003 | Miller ..................... 280/638 |
| 7,080,844 | B2 * | 7/2006 | Espejo ................. 280/33.995 |
| 8,075,016 | B2 | 12/2011 | Silberberg |
| 8,172,256 | B2 * | 5/2012 | Fine ....................... 280/651 |
| 8,408,581 | B1 | 4/2013 | Hunter |
| 8,540,273 | B2 * | 9/2013 | Dobrachinski ........... 280/651 |
| 8,567,809 | B2 | 10/2013 | White |
| 2008/0061531 | A1 * | 3/2008 | Nugent ................. 280/638 |
| 2009/0283989 | A1 * | 11/2009 | Abecassis ............. 280/651 |
| 2011/0156375 | A1 * | 6/2011 | Gal ....................... 280/651 |
| 2014/0369801 | A1 * | 12/2014 | Beauchamp et al. ....... 414/800 |

* cited by examiner

Primary Examiner — John Walters
Assistant Examiner — Brian Swenson

(57) ABSTRACT

The shopping cart has a foot pedal mechanism to adjust the height of the shopping basket to accommodate different sized users and can lower the cart height automatically with just the push of a button. The shopping basket includes separate detachable smaller bags used for bringing in items from the car. The cart is also designed to be fully collapsible to a height of only six inches and can be easily loaded into the rear trunk space of a car or SUV. The entire basket is also both collapsible and expandable in size and can also be detached from the cart easily and includes at least two carrying handles.

15 Claims, 14 Drawing Sheets

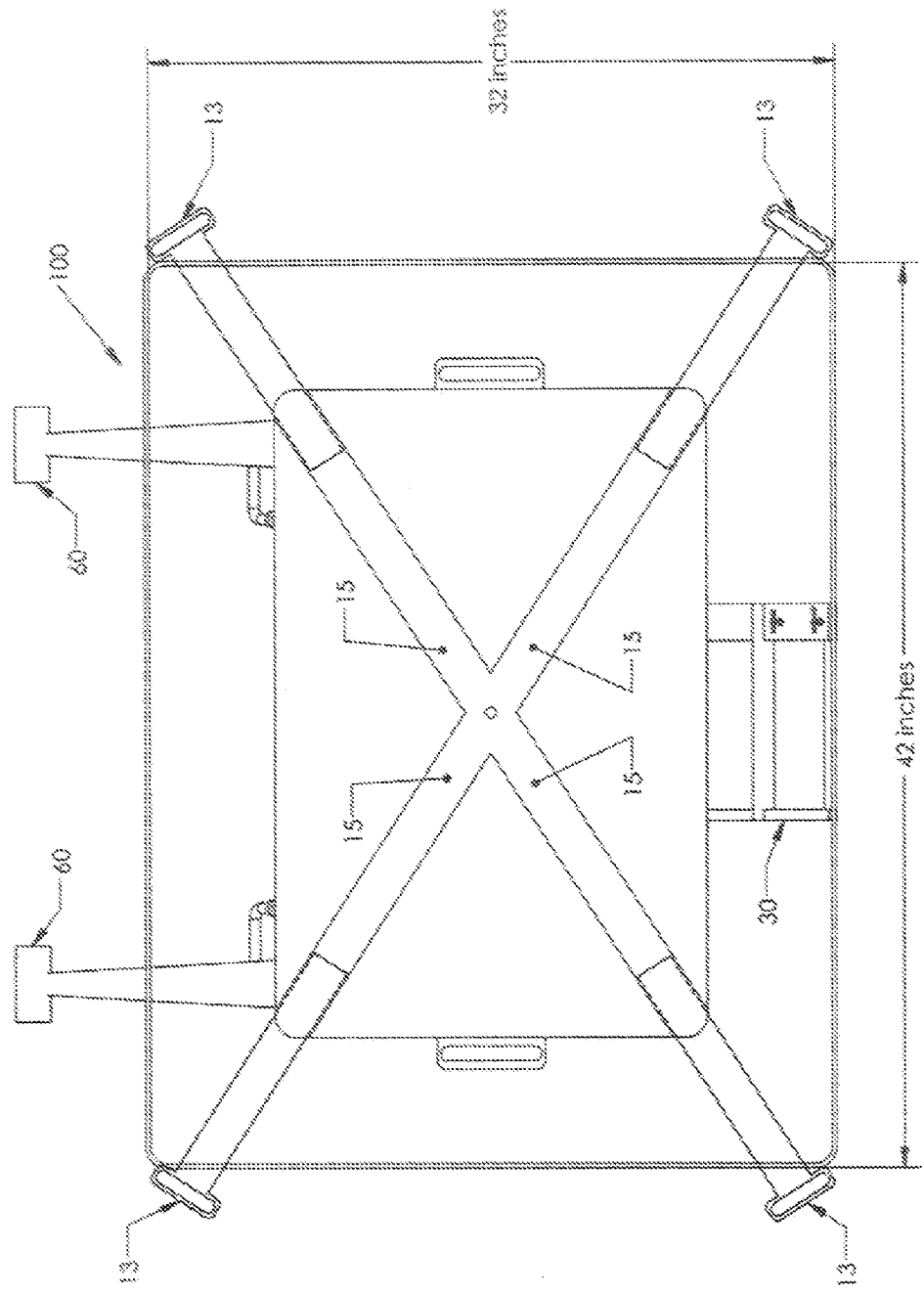

SHOPPING CART

FIELD OF THE INVENTION

The present invention relates to shopping carts, and more particularly to a shopping cart that has several substantial capabilities over shopping carts or prior arm.

BACKGROUND OF THE INVENTION

Shopping carts have been in use since the mid 1930s when Sylvan Goldman obtained the first shopping cart patent on Mar. 15, 1938. Shopping carts are now widely used in almost every country now and continue to grow in popularity due to their many desirable features. However, unlike many other consumer products, the shopping cart has not evolved substantially to adjust to the needs of the modern day consumer shopper. As a first example, shopping carts have failed to evolve for the modern shopper who shops at bulk discount store chains. Shopping at such chains becomes a chore when unloading the groceries into the car due to the fact that many of these bulk shopping chains do not provide bags in the store in order to keep costs low for the shopper. Another example is that prior art shopping carts are not normally sold to consumers and are left in parking lots with large variations in cleanliness and repair of carts. Yet another example is that shopping carts are normally provided at fixed heights and taller and shorter shoppers must deal with the ergonomic difficulties from the fixed height cart designs of prior art. Finally, for urban shoppers, many either are forced to shop in small quantities which they carry by hand back to their city residence or they improvise by using small sized collapsible carts which once again are limited in volume as compared with shopping carts of prior art. Indeed, there is a need to provide a modern shopping cart that can better satisfy these aforementioned limitations of the modern day shopper.

Although there have been many patents issued over the last few decades that have provided collapsible shopping carts for storage in cars, they do not have many additional other features desirable to the modern shopper. For example, U.S. Pat. No. 8,567,809 Collapsible Shopping Cart issued to White discloses a collapsible shopping cart having detachable shopping baskets. Although White's cart does have some advantages over the prior art, it does not offer any adjustability in height and by design cannot hold a large volume of shopping items typical of modern bulk shopping. U.S. Pat. No. 8,408,581 Collapsible Shopping Cart Device issued to Hunter discloses a collapsible shopping cart that also contains a collapsible open mesh basket large enough to be of use to the modern bulk shopper. However, Hunter's cart also does not allow for height adjustment and also does not have detachable shopping bags for easier transport of items once loaded into the car.

U.S. Pat. No. 8,075,016 Shopping Cart issued to Silberberg discloses a collapsible shopping cart having retractable legs which would allow the cart to be loaded into a vehicle with the entire contents remaining inside the shopping cart basket. Although Silberberg's cart would not require the shopper to unload items into the car, when the car arrives at home there is no longer any advantage as the basket design of Silberberg's cart lacks compartmentalization and would therefore rely on shoppers to use their own bags during shopping which is atypical of many modern bulk shopping chains. U.S. Pat. No. 6,328,329 Collapsible Shopping Cart with Removable Mesh Basket issued to Smith discloses a collapsible shopping cart having a single mesh basket which is also removable from the cart. Although Smith's cart would allow the shopper to carry the basket into the home directly from the car, it is still limited in that the weight of a typical large bulk shopping trip would require at least two people of average strength to carry into the home. Furthermore, Smith's cart as shown is of a low height and would have to be carried into the car by at least two people of average strength.

U.S. Pat. No. 6,042,128 Collapsible Shopping Cart issued to Dinkins discloses a collapsible cart having a main basket made of a web material for placing shopping items into one or more nested tub containers. Although Dinkins' cart does utilize multiple detachable baskets, it also has no height adjustment and its design would not allow for easy loading into the truck of a typical modern car or sports utility vehicle. U.S. Pat. No. 5,575,605 Elevatable Shopping Cart issued to Fisher discloses a collapsible shopping cart that does have height adjustment capability by either a hand crank mechanism or a hydraulic cylinder. Although Fisher's cart offers a major ergonomic improvement over typical fixed height carts of prior art, it lacks the other features to be disclosed in the present invention such as detachable baskets, and easy loading of the full cart into a car. Furthermore, Fisher's methods of adjusting the height would be difficult for older shoppers due to the hand strength required to use a hand crank and would not be allowed in many stores because many hydraulic cylinders are prone to leaks over time and the hydraulic oil residue would provide hazards to the store such as slipping on oil residue or potential product contamination from leaked hydraulic oil.

U.S. Pat. No. 5,531,366 Carry Out Caddy for Shopping Carts issued to Strom discloses a collapsible shopping cart having reusable and fully collapsible shopping bags that are further compartmentalized for easy unloading. Although Strom's cart would complement today's environmentally conscientious shoppers as it uses reusable collapsible bags, it is clearly not designed to load easily into a car or sport utility vehicle trunk as it does not allow height adjustment. Strom's caddy is more of an accessory invention to a shopping cart. As a final example, U.S. Pat. No. 4,765,646 Collapsible Shopping Cart issued to Cheng discloses a collapsible shopping cart having a base support to enable carrying heavy loads without deforming. However, Cheng's cart, once again, also lacks other desirable features to the modern bulk shopper such as height adjustment, ease of loading into car trunks and detachable baskets.

Clearly, the collapsible cart inventions of prior art disclosed here do not fully satisfy all of the features of the present invention which are easy loading of the full cart into the trunk of a vehicle while still fully loaded, adjustable height to provide for a wide range of shopper heights, detachable and reusable mesh bags to allow easy transport of bulk shopping items into both suburban and urban residences by shoppers of all age groups and genders.

BRIEF SUMMARY OF THE INVENTION

It is an object of the present invention to provide a shopping cart that can collapse down to a very short height of preferably six inches maximum.

It is yet another object of the present invention to provide a shopping cart that can be easily loaded and secured into the trunk rear storage space of modern vehicles including trucks and sport utility vehicles with a full load of groceries.

It is yet another object of the present invention to provide a shopping cart that has a plurality of compartmented reusable baskets to allow for easy unloading of the shopping cart at the final destination.

It is yet another object of the present invention to provide a shopping cart that has an easy to use mechanism to allow the cart to be raised or lowered to various heights to better accommodate different sized shoppers as well as for assistance in the loading of the cart into a vehicle.

It is a final object of the present invention to provide a shopping cart basket that can not only collapse to a height of less than six inches but also can expand outward in length and width to accommodate the rear trunk storage space available in both small, midsize and large sized sport utility vehicles.

BRIEF DESCRIPTION OF THE INVENTION

FIG. 12 is a top view of the shopping cart shown with the shopping basket at its maximum length and maximum width setting.

DETAILED DESCRIPTION OF THE INVENTION

Figure 1:
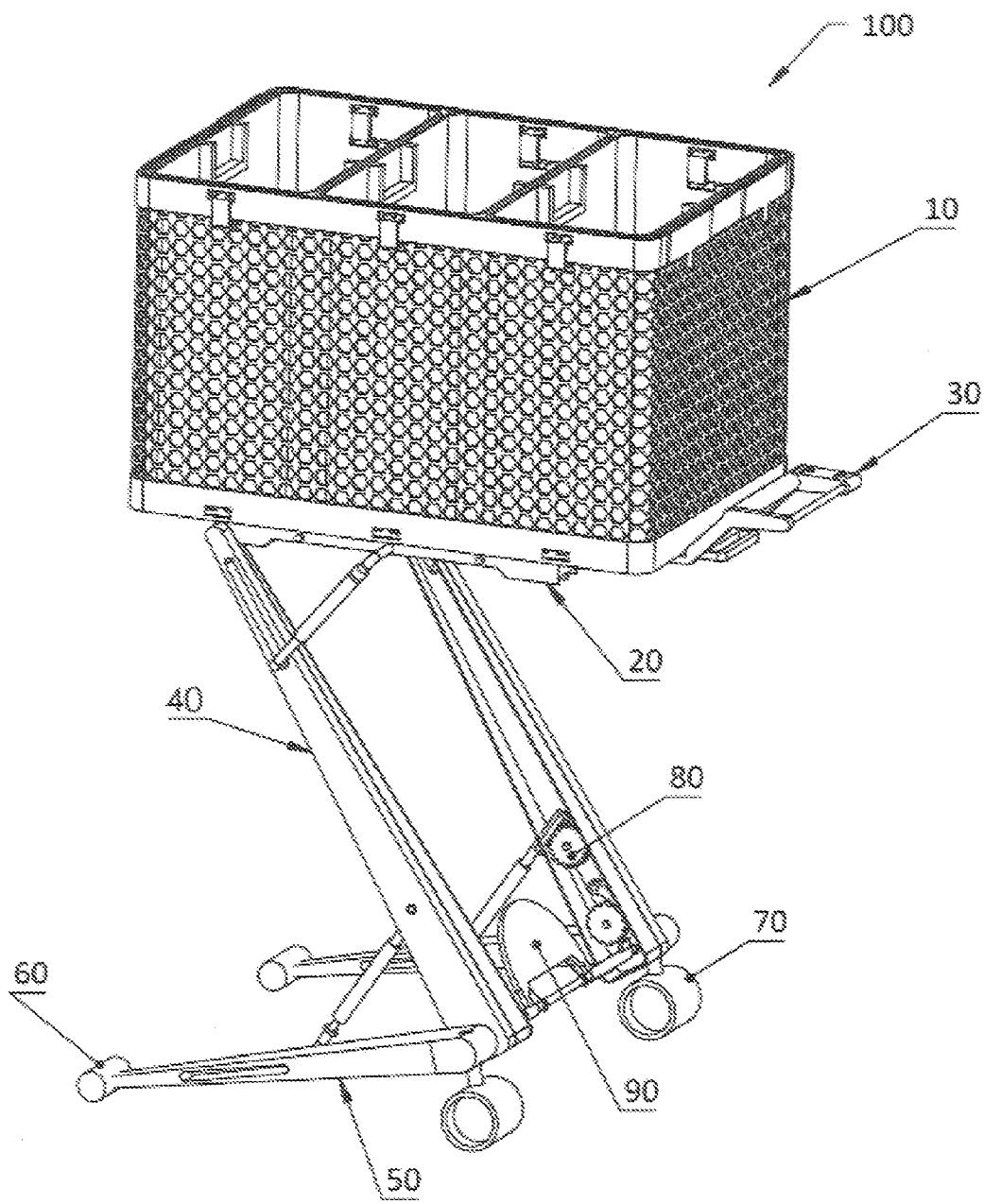
FIG. 1 is a perspective view of the shopping cart fully extended state.

Referring now to the drawings and in particular FIG. 1, a shopping cart according to the present invention is generally designated by reference numeral 100. Cart 100 is further comprised of a basket 10, a basket carrier 20, a handle 30, an upper leg assembly 40, a lower leg assembly 50, a set of front wheels 60, a set or rear wheels 70, an elevation mechanism 80, and a foot pedal 90. Each of these components shall be further described in detail in order to describe the operation and intended use of the present invention.

Figure 2:
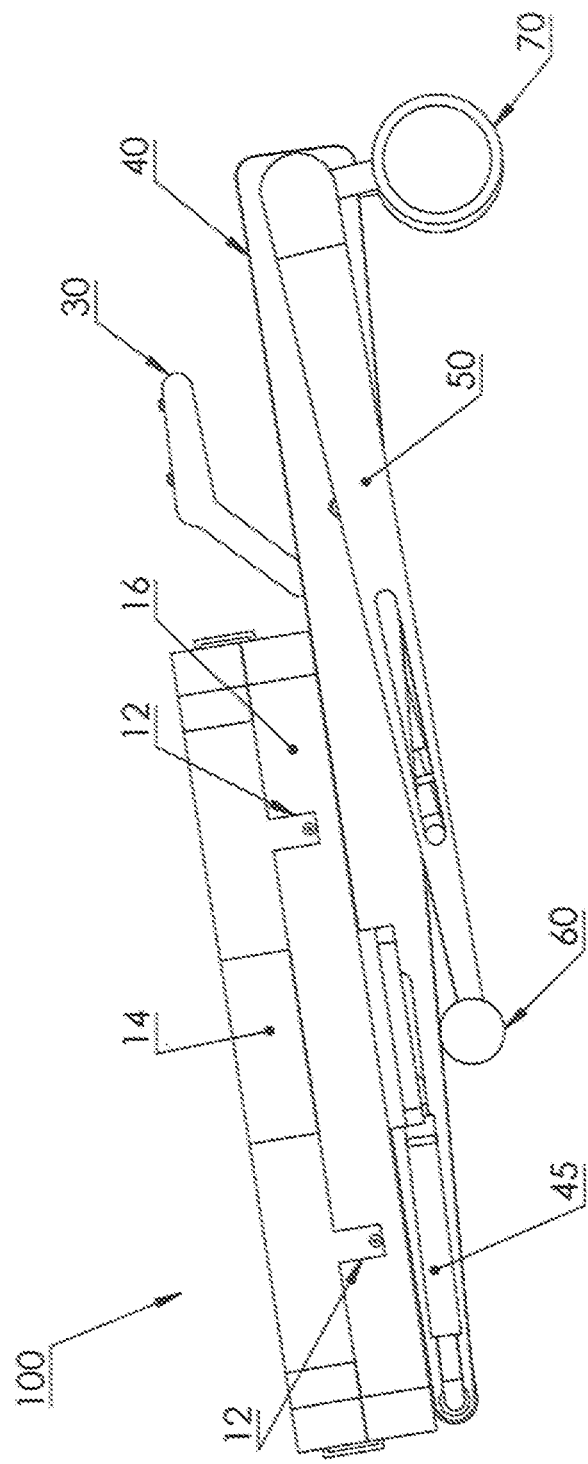
FIG. 2 is a side view of the shopping cart in a fully collapsed state.

Referring next to FIG. 2, shopping cart 100 is shown in a fully collapsed state. As a first objective of the present invention, the shopping cart 100 can collapse into a flattened state of approximately six inches in height. Only a few simple steps are required to collapse the cart. First, basket 10 consists of a flexible open mesh fabric which is wrapped around a spring coil to form the four walls of the basket. This collapsible fabric with embedded spring design is already commonly practiced to fabricate baskets and containers in other products including collapsible laundry baskets and collapsible toy containers. The top basket rim 14 and bottom basket rim 16 of basket 10 are then compressed together and held in place by securing straps 12. Preferably and as shown in FIG. 1, at least four securing straps 12 (two on each side of the basket) are recommended to keep the basket secured firmly together. Next, basket 10 also has a bottom floor 18 which further contains a center hole 19 allowing said basket 10 to rotate relative to the basket carrier 20. This allows the now collapsed basket to be in a more compact state because the short sides of the rotated basket 10 are now parallel to the upper legs 40 of cart 100.

Figure 3:
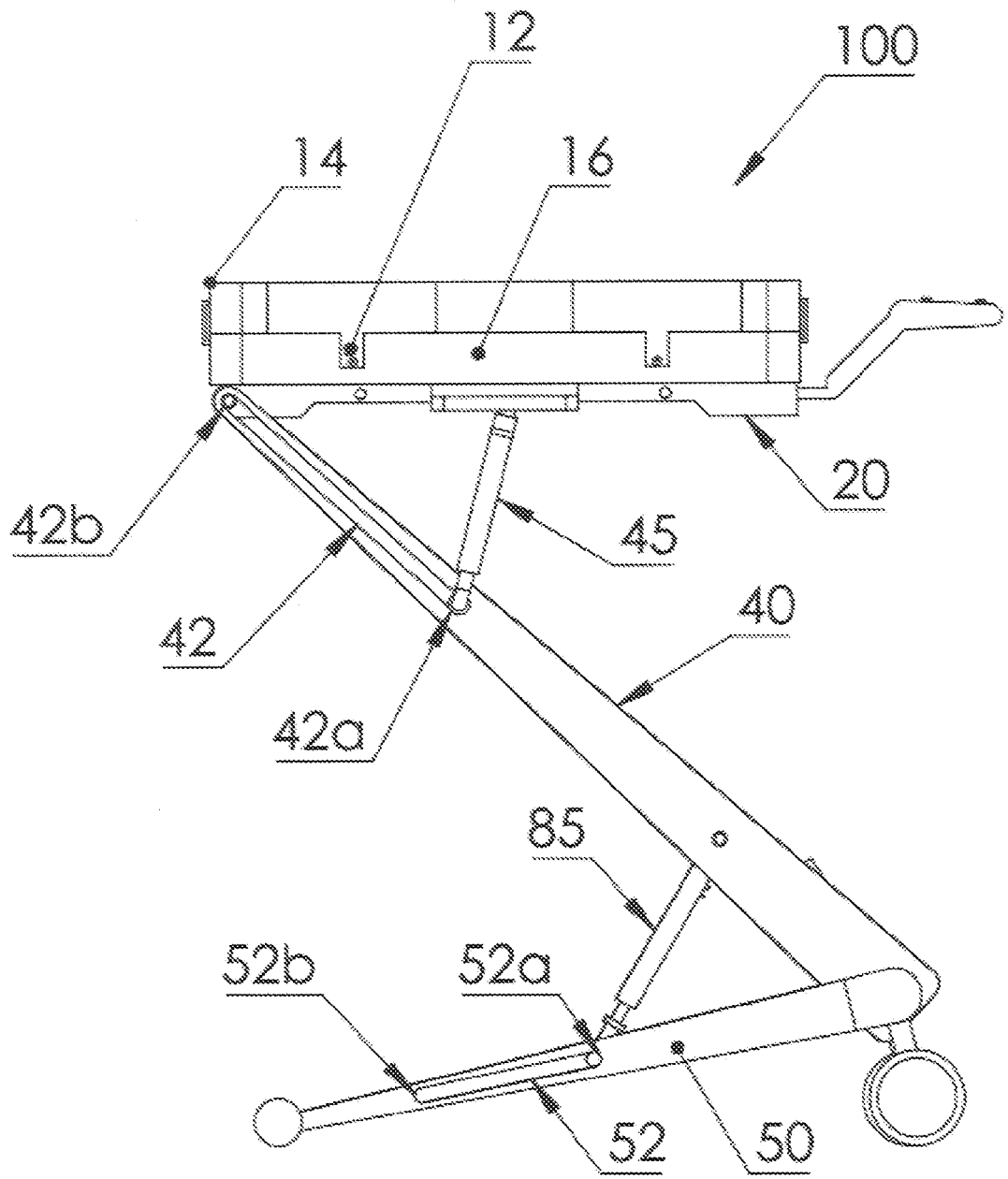
FIG. 3 is a side view of the shopping cart fully extended but with a fully collapsed basket.

Referring next to FIG. 3, the distal end 42a of support bar 45 which is seated inside a slotted hole 42 located on upper leg 40 is then pushed upward towards the far distal end 42b of slotted hole 42. This movement of the support bar will then cause the now collapsed basket 10 and basket carrier 20 to collapse down upon the top faces of the two upper legs 40. The final step is then to push the distal end 52a of the elevating bar 85 which is seated in slotted hole 52 of lower leg 50 toward the opposite distal end 52b. This movement will cause the upper leg collapsed assembly to collapse down upon the lower legs 52 to complete the collapsing of the cart 100 to result in the state as previously shown in FIG. 2.

Figure 4A:
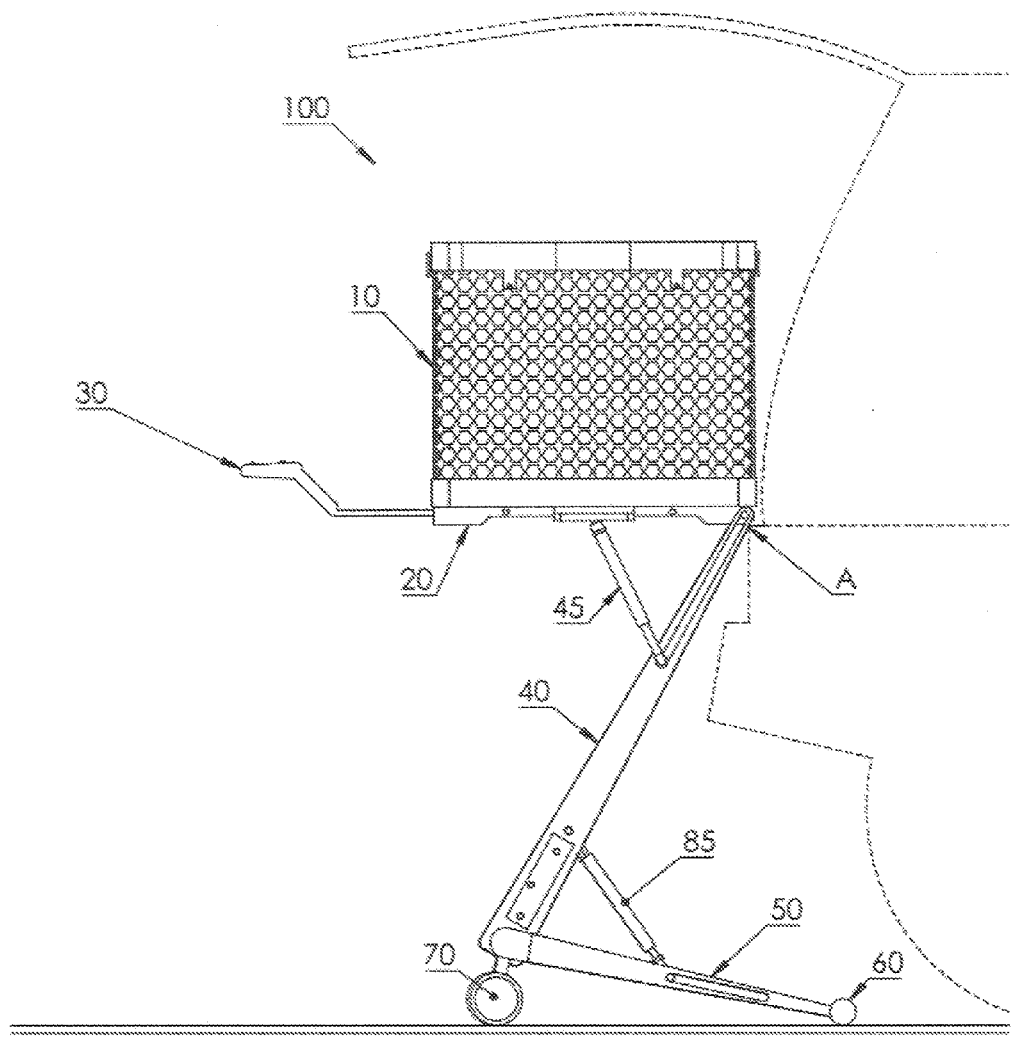
FIG. 4a is a side view of the shopping cart shown at the beginning of loading into an SUV rear trunk.
Figure 4B:
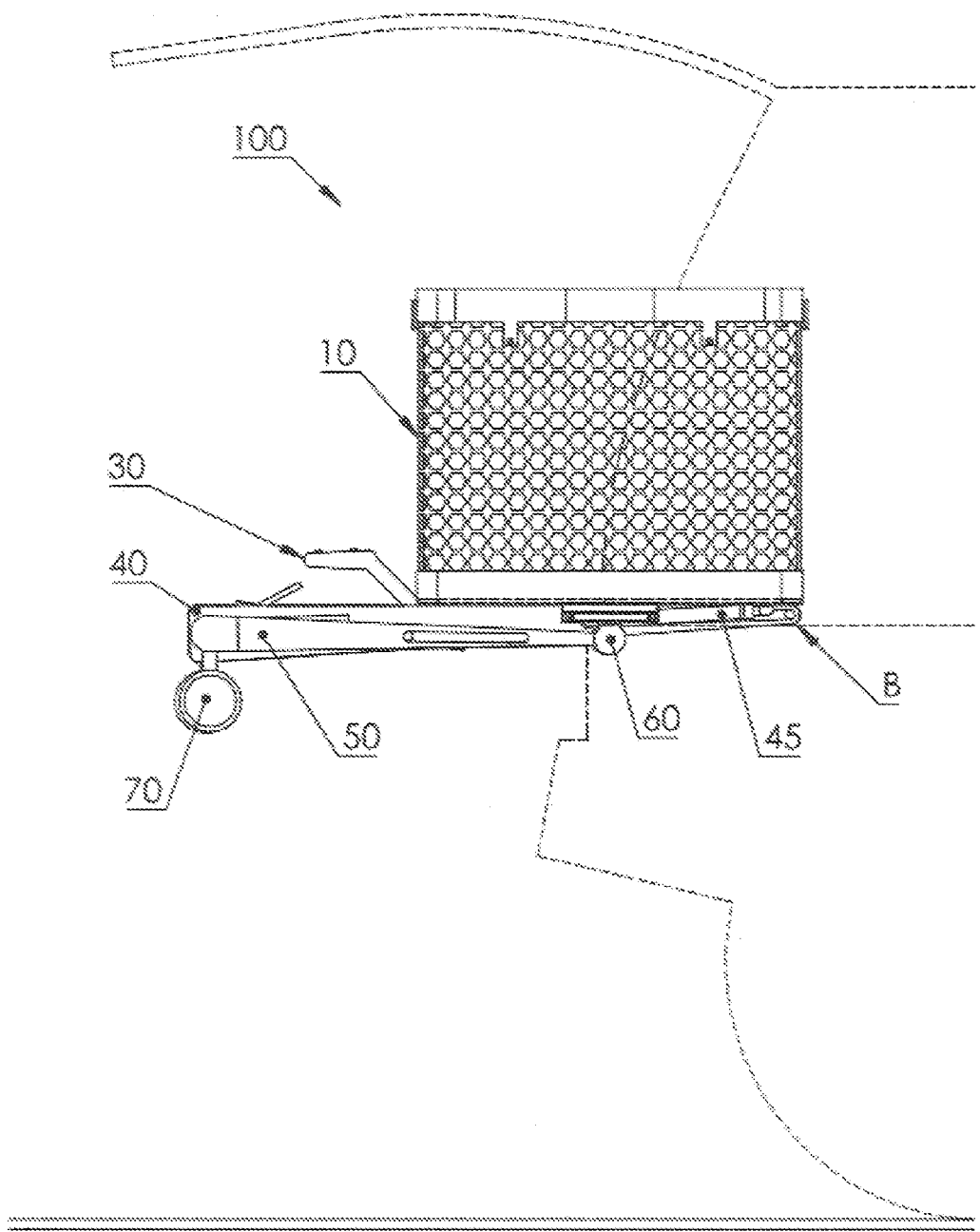
FIG. 4b is a side view of the shopping cart shown being loaded into the SUV rear trunk.
Figure 4C:
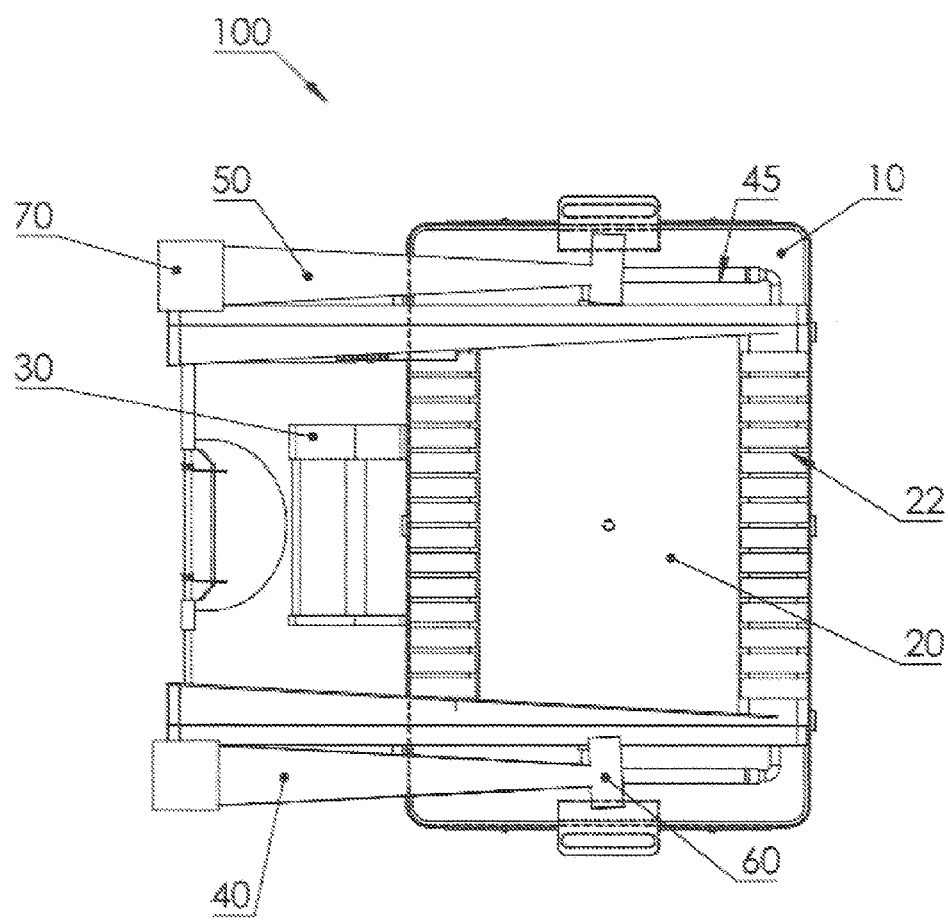
FIG. 4c is a bottom view of the shopping cart.

It is yet another object of the present invention to provide a shopping cart that can be easily loaded and secured into the trunk rear storage space of modern vehicles including trucks and sport utility vehicles (SUV) with a full load of groceries. Referring next to FIGS. 4a thru 4c, the preferred method of loading said shopping cart 100 into the trunk storage area of an SUV shall next be described. The loading of said shopping cart 100 into a car or SUV trunk is accomplished by several simple steps as follows. The first step is the rotation of basket 10 such that the shorter sides of said basket 10 are parallel to the left and right sides of the main body of cart 100. The main reason for the cart basket rotation requirement is the limited trunk depth of typical modern cars and SUVs so that the cart 100 will have enough room to fit inside without having to lower the rear seats. Once said basket 10 is rotated, the shopping cart is then elevated such that the height of the basket carrier 20 is just above the surface of the SUV or car trunk (this surface is shown as dashed line "A" and is shown in FIG. 4a.) The handle 30 is then retracted fully into said basket 10 which then acts upon said distal end of support bar 45 causing the support bar to slide towards new position "B" as shown in FIG. 4b.

Although not visible in FIG. 4b, handle 30 is rigidly attached to said distal end of support bar 45 inside a slotted pocket inside said basket carrier 20. The movement of said support bar 45 allows the entire upper leg 40 to rotate upward towards the shopper as the cart 100 is pushed into the truck of the car or SUV. In this position as shown in FIG. 4b essentially the upper legs 40 and lower legs 50 are nearly parallel to each other and provide the shopper ample leverage to slide said cart 100 fully into the car or SUV trunk space and is similar to the motion of moving a hospital gurney into an ambulance. To further help reduce sliding friction on the carpeted interior surface of the car or SUV trunk while said cart 100 is loaded, the bottom face of said basket carrier 20 contains a plurality of thin ribs 22 that run parallel to the direction of cart movement as shown in FIG. 4c.

Figure 5:
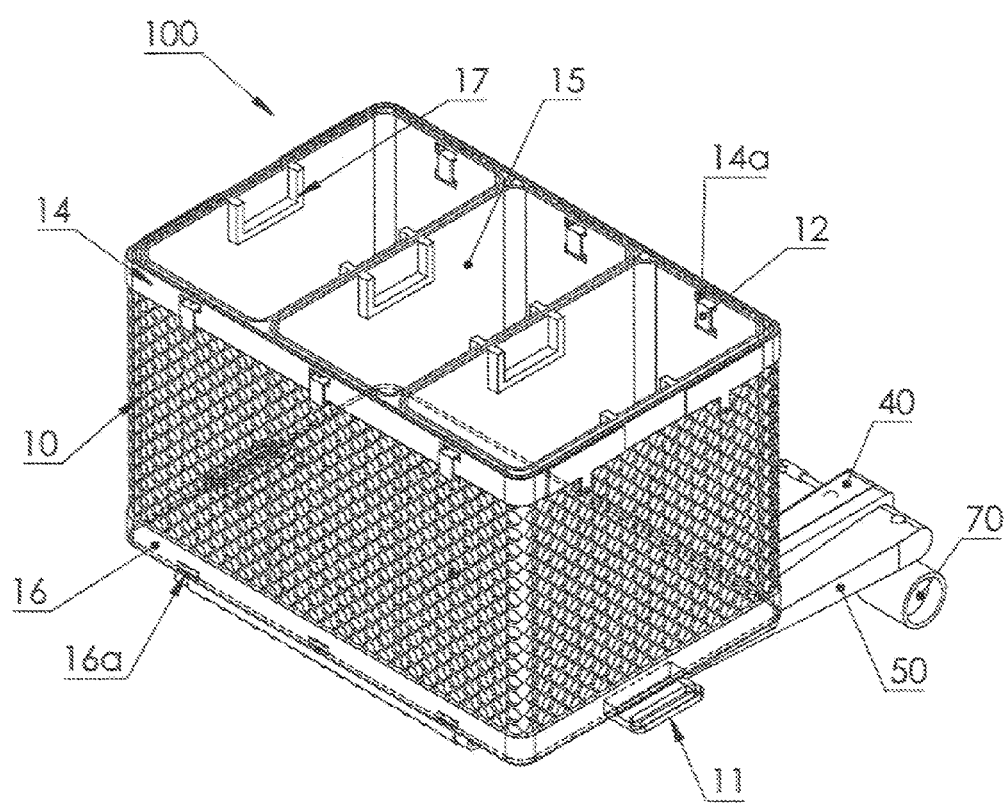
FIG. 5 is a perspective view showing the shopping basket with detachable internal bags.

Referring next to FIG. 5, it is yet another object of the present invention to provide a shopping cart that has a plurality of compartmented reusable baskets to allow for easy unloading of the shopping cart at the final destination. In the preferred embodiment, said basket 10 of cart 100 is further comprised of a plurality of smaller carrying bags 15 with each bag having at least one carrying handle 17. It should be obvious to one skilled in the art of shopping bag design that the main basket 10 may carry different sized carrying bags 15, and the cart 100 of the present invention may be sold with different numbers, shapes and sizes of carrying bags 15 to suit the shopping styles of shoppers of all ages and genders. In the embodiment shown in FIG. 5, three equally sized smaller bags 15 are shown to fit snugly inside main basket 10. As an option to secure said smaller bags during transit, securing straps 12 can be used to secure the smaller bags 15 to main basket 10 using slotted apertures 14a spaced along the perimeter of basket top rim 14. The basket bottom rim 16 may also contain a plurality of apertures 16a for use in attaching securing straps to trunk compartment to help prevent the cart 100 from moving around the trunk during transportation. As an alternative to the preferred embodiment of using carrying bags 15 to carry in the shopping contents, said basket 10 also contains a plurality of carrying handles 11 for use in lifting out said basket 10 from said basket carrier 20 and transporting the entire basket 10 as one unit.

Figure 6:
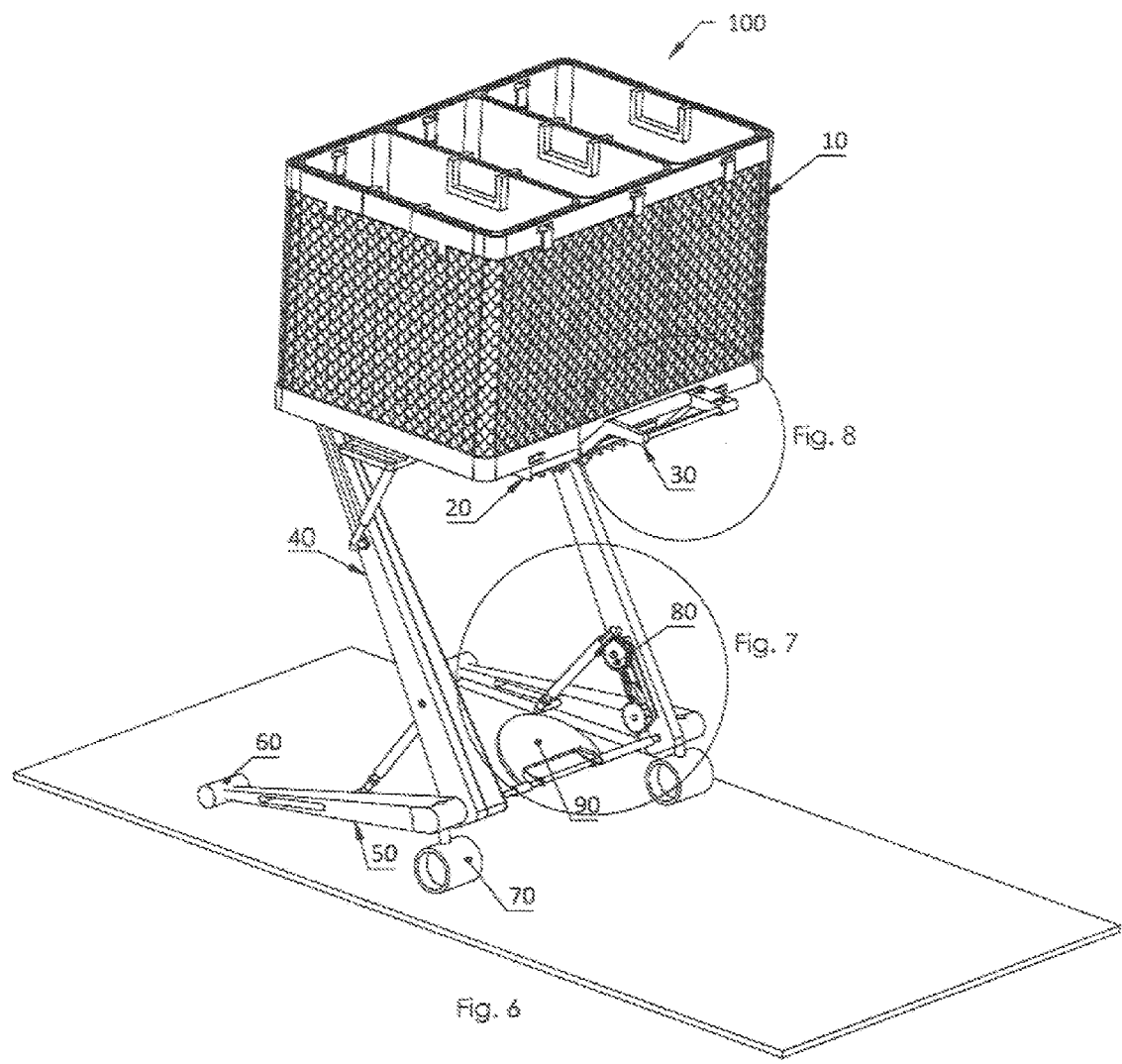
FIG. 6 is a perspective view of the shopping cart's elevation mechanism.

It is a final another object of the present invention to provide a shopping cart 100 that has an easy to use mechanism to allow the cart to be raised or lowered to various heights to better accommodate different sized shoppers as well as for assistance in the loading of the cart to the proper trunk height of a vehicle. Referring next to FIGS. 6 thru 9, the mechanism for adjusting the height of cart 100 shall next be explained in detail. FIG. 6 shows a view of the cart 100 with the right lower leg panels removed in order to show the details of the cart elevation mechanism 80.

Figure 7:
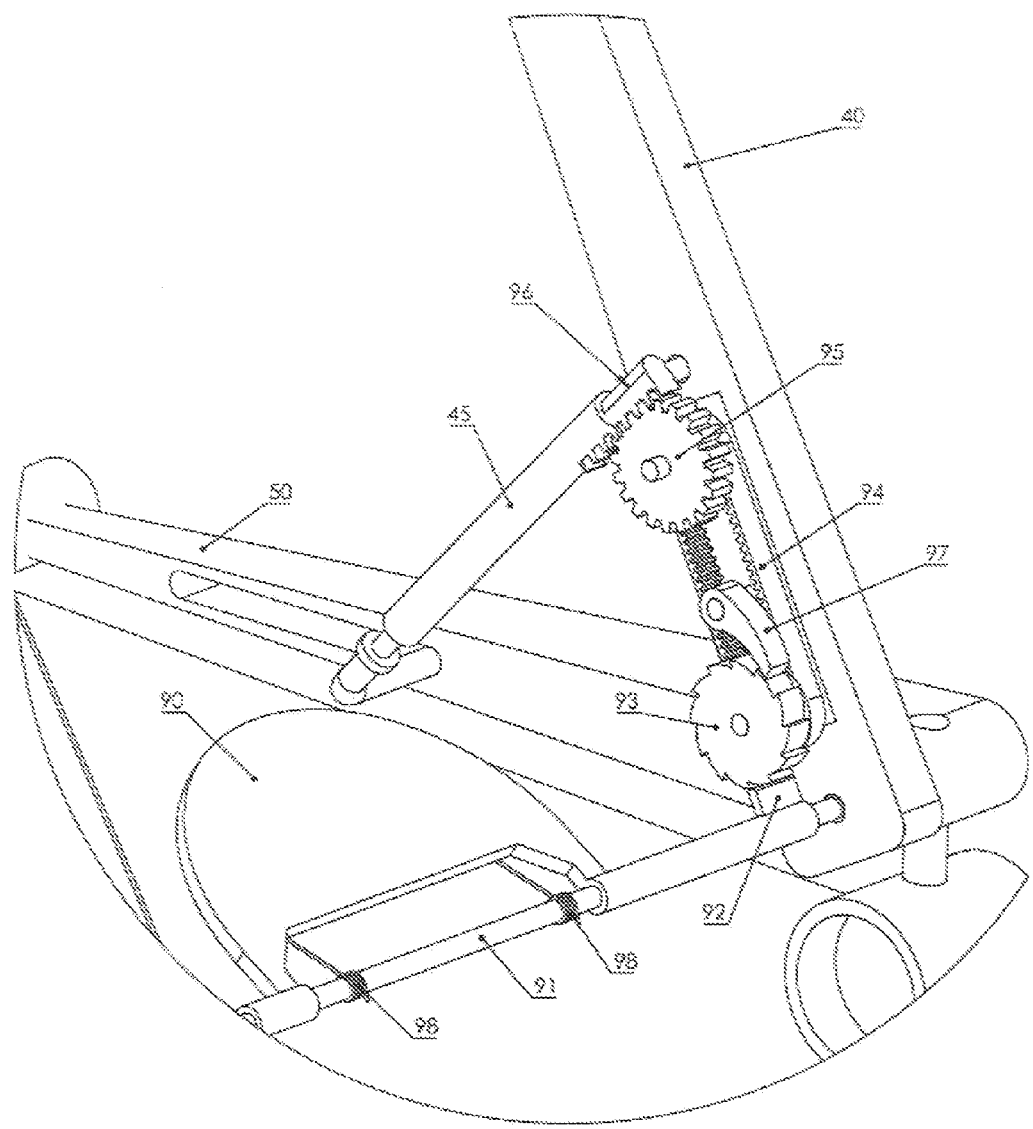
FIG. 7 is a detailed view of the shopping cart's elevation mechanism.

Referring next to FIG. 7, in the preferred embodiment, the cart 100 is elevated in height using a ratchet gear driven belt drive assembly. In order to raise the cart, the shopper first presses down with one of their feet on the foot pedal 90. The foot pedal 90 is mounted on a shaft 91 which has at one distal end a protrusion 92 which is in contact and can rotate the ratchet gear 93. The ratchet gear 93 then drives a second gear 95 by using a power transmission belt 94 and is prevented from rotating backwards (or counterclockwise as shown in FIG. 7) by a pawl 97. Each depression of said foot pedal 90 will therefore index the ratchet gear 93 which further indexes the driven gear 95 an equal degree of clockwise rotation. Finally, said driven gear 95 is meshed together with a toothed rack 96 which is rigidly connected to said support bar 45. Once the foot pedal is depressed, a set of torsion springs 98 act to return the depressed pedal 90 back to its starting position. With the design of the preferred embodiment, shoppers of all ages can elevate the cart because of the leverage of using their legs. Furthermore, this design is light weight compared to using alternatives such as electric motors and batteries.

Figure 8:
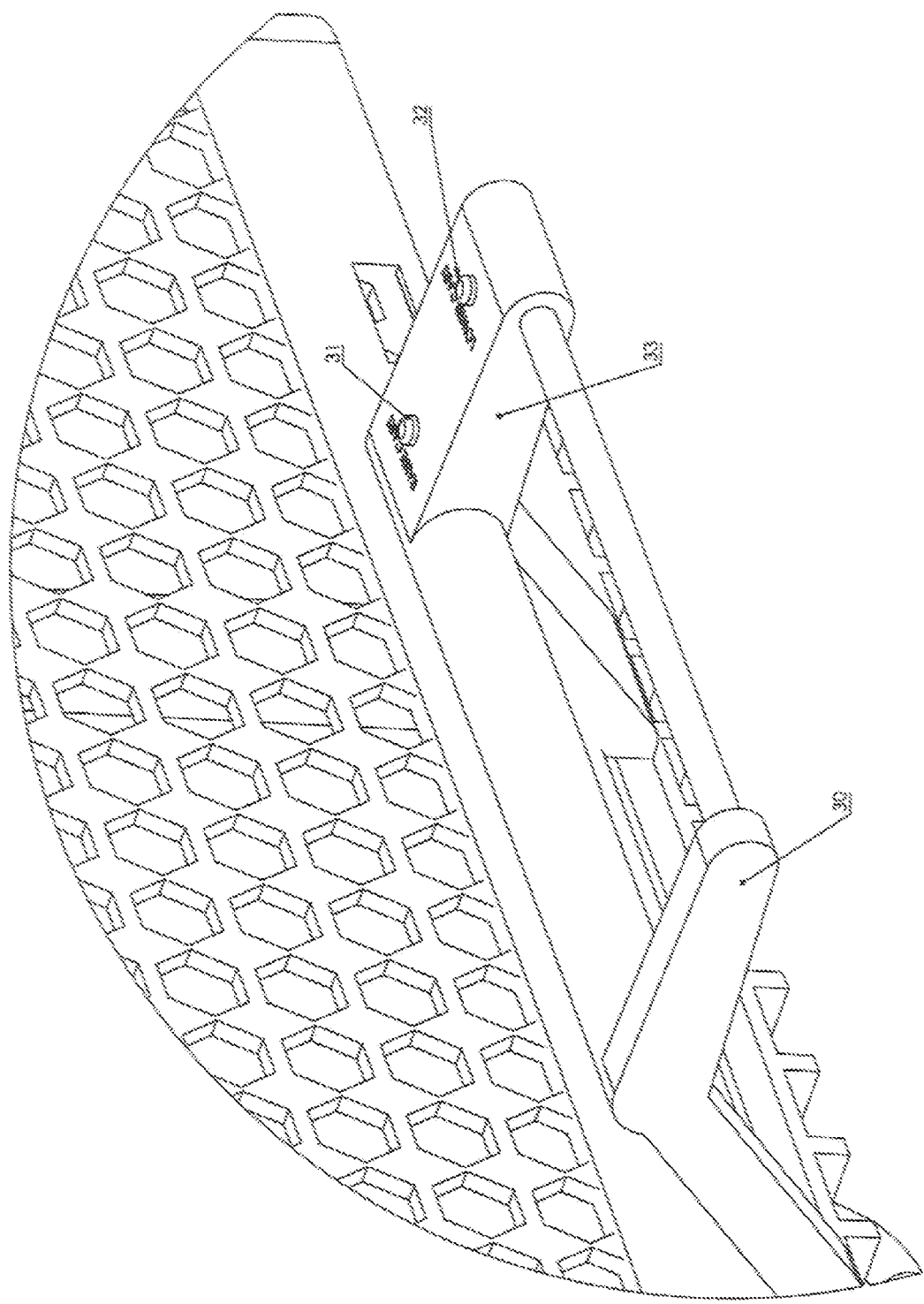
FIG. 8 is a detailed view of the shopping cart's handle.
Figure 9:
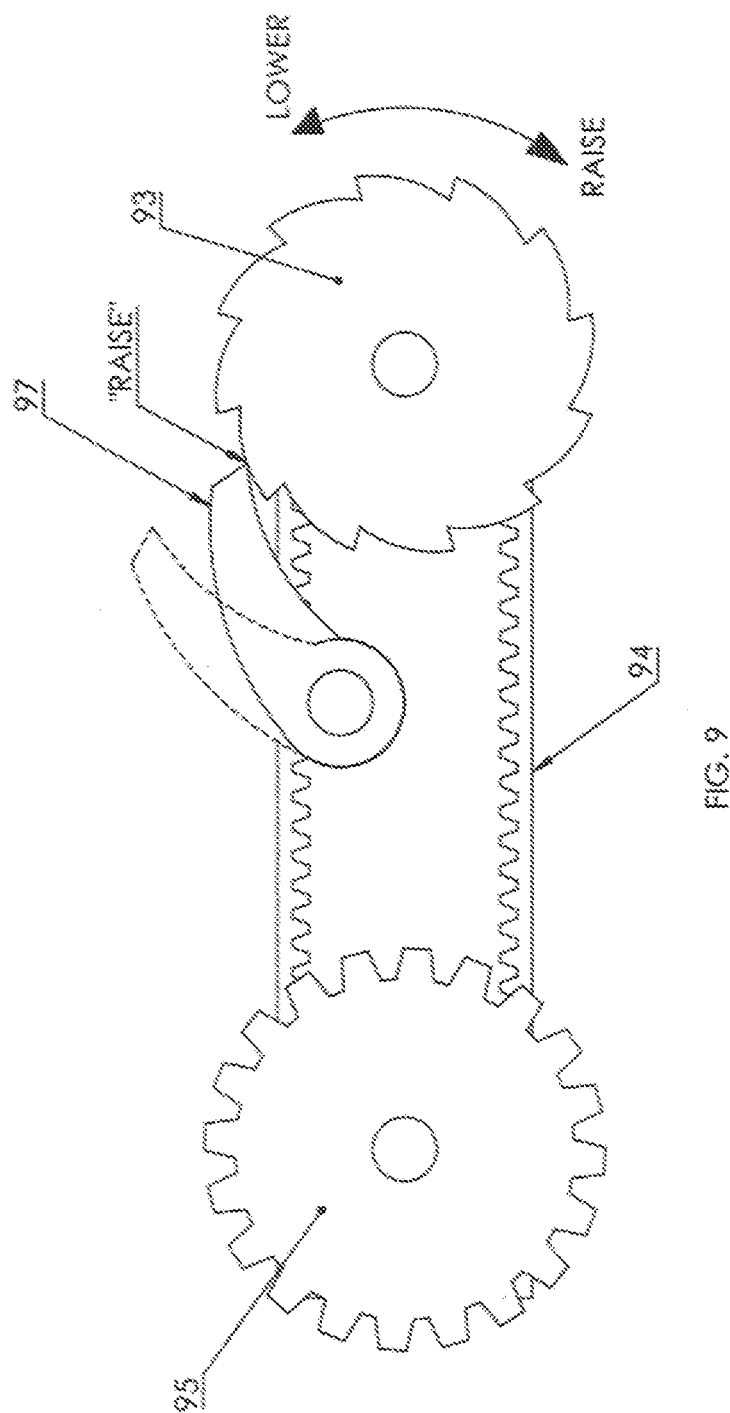
FIG. 9 is a detailed view of the shopping cart's ratchet gear elevation mechanism.

Referring next to FIG. 8, said handle 30 further contains a "raise cart" button 31 and a "lower cart" button 32 that are both connected to an embedded wireless transmitter device inside the handle body which is depicted as item 33 in the drawing. Although a detailed electrical schematic of said wireless transmitter device is not disclosed here, one skilled in the art of wireless switches would be able to design a compact wireless switching transmitter that would send wireless radio frequency waves in two different frequencies depending on which button was selected. Referring finally to FIG. 9, the result of the wireless transmitter device 33 is shown. When the raise cart button 31 is depressed on handle 30, a wireless transmitter device 33 sends a signal to a wireless receiver switch device 34 which is part of the elevation mechanism 80. Said switch device 34 will move the pawl 97 to the "RAISE" position which is in intimate contact with said ratchet gear 93. In this mode, the cart can be elevated as explained previously.

Referring back to FIG. 8, when said cart 100 is to be lowered, the "lower cart" button 32 is depressed and sends a different frequency signal to said wireless switch device 34. The switching device then acts upon pawl 97 and rotates the pawl counterclockwise and away from contact with said ratchet gear 93. While the pawl 97 is disengaged from said ratchet gear 93, the weight of the basket 10, and carrier 20 will cause the cart to slowly lower itself because the rack 96 would then move in the opposite direction due to counterclockwise rotation of said driven gear 95 as well as ratchet gear 93. In this manner, the shopper can at will raise and lower the cart. Although gravity will naturally lower the cart, the shopper will have to use foot power to raise the cart as previously explained.

Figure 10:
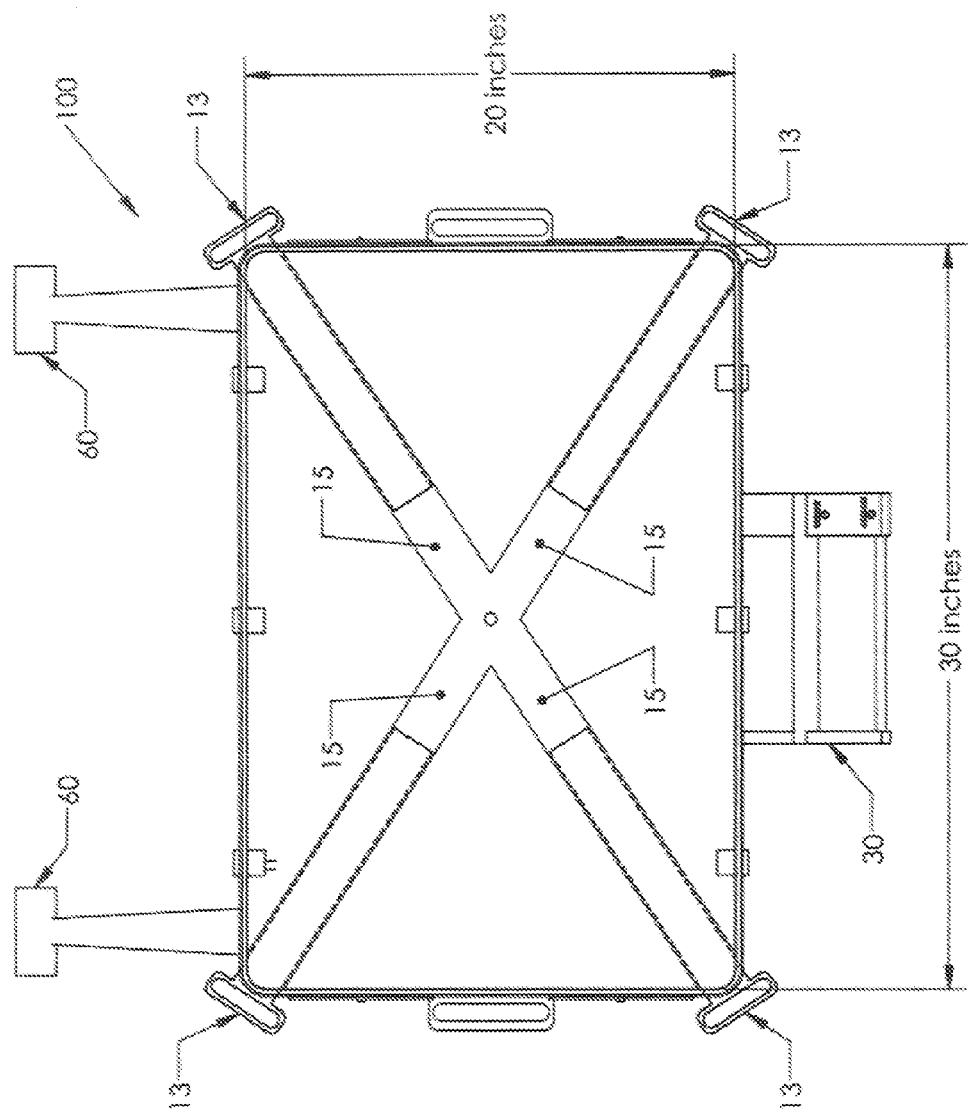
FIG. 10 is a top view of the shopping cart shown with the shopping basket at its minimum length and minimum width setting.
Figure 11:
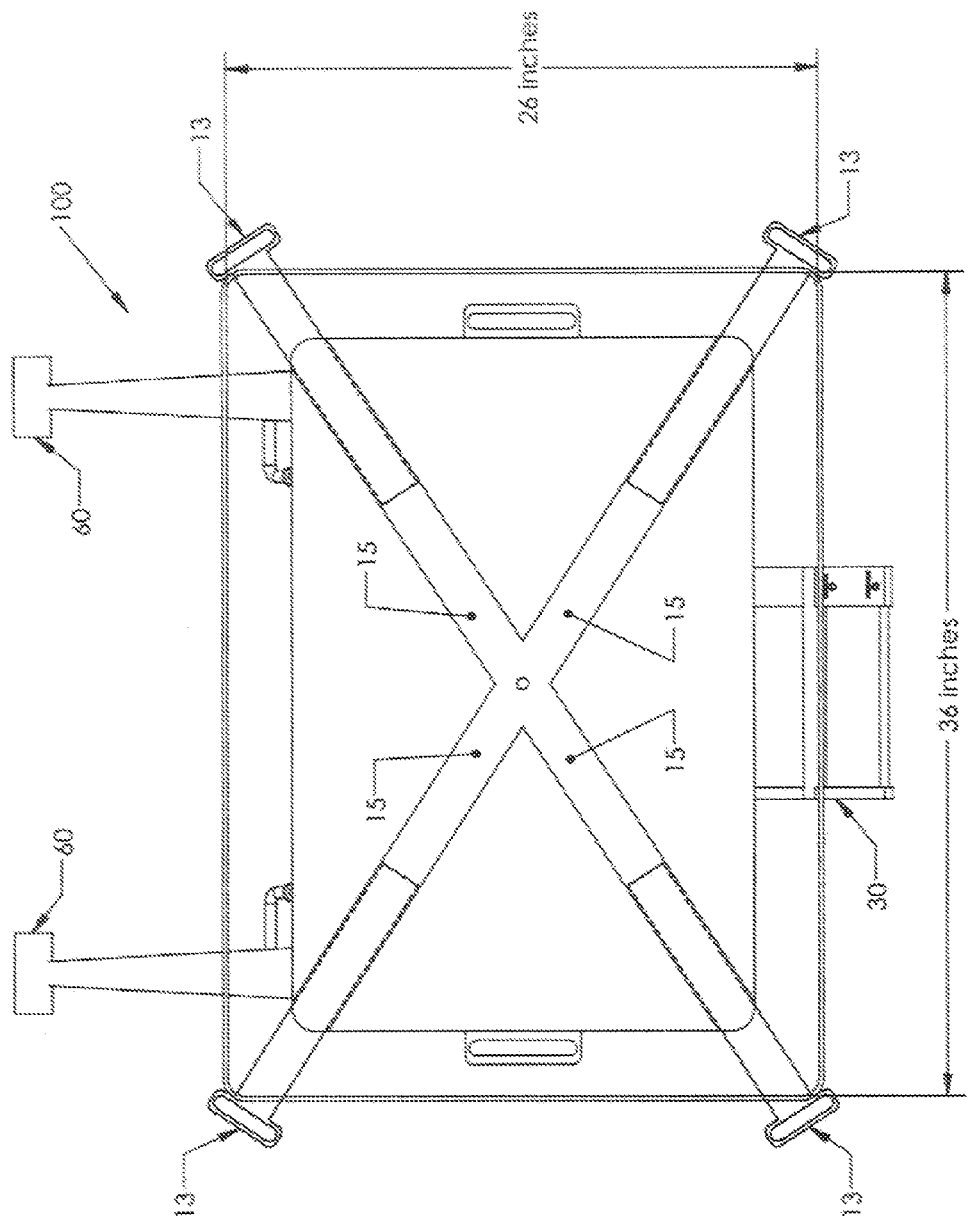
FIG. 11 is a top view of the shopping cart shown with the shopping basket at its median length and median width setting.

Referring finally to FIGS. 10 through 12, in an alternative embodiment, the shopping cart basket can be easily adjusted in both its length and width dimensions in order to increase the overall volume of the cart's carrying capacity. In the preferred embodiment, this is accomplished by pulling outward a set of four basket pull tabs 13 that are located in slotted apertures that are located on pull tab housings 15. Said tab housings 15 are preferably molded into the main body of said basket bottom 18. Said pull tabs 13 are also attached to each of the four flexible corners of said basket 10 which is made of a material fabric that is both strong and stretchable. In the first embodiment shown in FIG. 10, the pull tabs are not yet pulled outward and this size of 30 inches by 20 inches represents a preferred minimum cart basket carrying capacity of 10800 cubic inches. In the second embodiment shown in FIG. 11, the pull tabs are partially pulled outward and this larger size of 36 inches by 26 inches represents a preferred median cart basket carrying capacity of 16848 cubic inches. And finally in the third embodiment shown in FIG. 12, the pull tabs are now fully pulled outward (to the limits of the fabric of the basket), and this size of 42 inches by 32 inches represents a preferred maximum cart basket carrying capacity of 24192 cubic inches. Although not shown in these drawings, one skilled in the art of flexible fabric baskets may design simple methods to lock down said pull tabs 13 into various intermediate fixed positions which would allow the cart basket to carry other volumes in the range between approximately 10800 and 24192 cubic inches.

What is claimed is:

1. A collapsible shopping cart comprising:
   A) a frame which comprises a set of two upper longitudinal members that are parallel and are pivotally mounted to a separate basket carrier at their upper distal ends, and a set of shorter longitudinal lower members that are also parallel and are pivotally mounted to the upper members at their lower distal ends;
   B) a longitudinal cross support rod which is pivotally mounted at its left distal end to one set of upper and lower longitudinal frame members and at its right distal end to another set of upper and lower longitudinal frame members;
   C) a basket carrier platform that is pivotally mounted at its front distal end to both the upper longitudinal frame members at their upper distal ends and which further comprises a circular aperture at its geometric center as well as at least one pair of side circular apertures located approximately at the longitudinal midpoint and at the left and right sides of the platform and also a slotted rectangular aperture at its rear distal end;
   D) a handle which comprises a main handle grip, a set of side support members that are rigidly mounted to the grip and extend into the slotted aperture of said basket carrier, and a wireless two button radio frequency transmitter mounted internally into one of the side support members;

E) a web basket which comprises a main web material on all four sides of the basket, a coiled spring that is assembled into the web fabric and which runs around all four sides of the basket, a base platform upon which the web basket is rigidly mounted to, and a set of rectangular shaped frame members that are rigidly attached to the web basket material with one frame member rigidly mounted at the top opening of the basket and the other frame member rigidly mounted at the bottom end of the web basket;

F) two front wheels which are each pivotally mounted to a different one of the pair of shorter longitudinal lower frame members at their front distal ends;

G) two rear wheels which are each pivotally mounted to a different one of the pair of shorter longitudinal lower frame members at their rear distal ends;

H) an elevation mechanism which is mounted to one of the upper longitudinal frame members at its lower distal end and which comprises a ratchet gear, a pawl, a toothed drive gear, a power transmission belt, a wireless radio frequency receiver switch that is rigidly mounted to said pawl, and a toothed rack which is concentrically mated with one of the upper frame longitudinal support brace rods;

I) a foot pedal which further comprises a main pedal body, a first shaft sleeve on one distal end that is concentrically mated to said longitudinal rod and a second and longer length shaft sleeve that is concentrically mated to said longitudinal rod and which has a transverse protrusion ending outward in a radial direction and is in contact with said ratchet gear;

J) a pair of upper frame support rods that are slidably engaged at their lower distal ends to slotted apertures located at the upper distal ends of the upper longitudinal frame members and are each pivotally mounted at their upper distal ends to one of the side support members of said handle; and K) a pair of lower frame support rods that are slidably engaged at their lower distal ends to slotted apertures located on the lower longitudinal frame members and are pivotally mounted at their upper distal ends to circular apertures located on the upper longitudinal frame members near their lower distal ends.

2. The shopping cart according to claim 1, wherein the upper and lower frame longitudinal members have slotted apertures and locking pins to allow the frame support rods to be adjusted in angular position to the upper and lower frame members.

3. The shopping cart according to claim 1, wherein the web basket may contain between one and twenty additional internal compartmented shopping bags, each bag having at least one carrying handle and each bag further having at least one Velcro style strap to secure to at least one aperture located on the upper rigid frame mounted at the top of the web basket.

4. The shopping cart according to claim 1, wherein the web basket may also contain a plurality of apertures spaced around the periphery on a lower rigid frame mounted at the bottom of the web basket.

5. The shopping cart according to claim 1, wherein the base platform of said web basket has a circular protrusion at the geometric center that is designed to be concentrically mated to a circular aperture located at the geometric center of the basket carrier.

6. The shopping cart according to claim 1, wherein the basket carrier platform has a plurality of thin ribs running along the bottom surface.

7. The shopping cart according to claim 1, wherein the web basket has at least two carrying handles with each handle being rigidly mounted to one of the shorter length sides of the base platform of said web basket.

8. The shopping cart according to claim 1, wherein the elevation mechanism is a ratchet gear driven mechanical system using at least one separate driven toothed gear with a power transmission belt mated to both said ratchet and toothed gears and with a pawl that can be selectively mated and unmated to said ratchet gear using a wireless switching module mounted adjacent to said pawl.

9. The shopping cart according to claim 1, wherein the lower frame support rods include shock absorbing or dampening components to slow down the downward velocity of said shopping cart when it is being lowered in height.

10. The shopping cart according to claim 1, wherein the basket carrier side walls contain a plurality of protrusions for use in securing said web basket when it is in a fully collapsed state.

11. The shopping cart according to claim 1, wherein the foot pedal, when not depressed, is kept in a fixed angular position by at least one pair of torsion springs which are concentrically mated to said longitudinal cross support rod.

12. The shopping cart according to claim 1, wherein the web basket fabric material of said web basket is made of a mesh fabric that is open enough to allow barcode scanners to read barcodes through the web fabric.

13. The shopping cart according to claim 1, wherein the wireless transmitter mounted inside the handle housing and wireless switching receiver mounted adjacent to the pawl as part of the elevation mechanism use communication frequencies within the allowable range of current FCC wireless device regulations.

14. The shopping cart according to claim 1, wherein the wireless transmitter mounted inside the handle housing and wireless switching receiver mounted adjacent to the pawl as part of the elevation mechanism are powered by AA series batteries.

15. The shopping cart according to claim 1, wherein the basket length and width dimensions can be increased by adjusting the position of four pull tabs in an outward diagonal direction so as to further stretch the flexible basket material to achieve a basket volume between approximately 10800 cubic inches and 24192 cubic inches.

* * * * *